(12) United States Patent
Fontenit et al.

(10) Patent No.: US 8,596,302 B2
(45) Date of Patent: Dec. 3, 2013

(54) MULTI-PATH VALVE DEVICE FOR FLUID CIRCULATION

(75) Inventors: Sébastien Fontenit, La Gaubretiere (FR); Thierry Picot, Vallet (FR)

(73) Assignee: Definox SAS, Getigne (FR)

( * ) Notice: Subject to any disclaimer, the term of this patent is extended or adjusted under 35 U.S.C. 154(b) by 387 days.

(21) Appl. No.: 13/024,099

(22) Filed: Feb. 9, 2011

(65) Prior Publication Data

US 2011/0197985 A1 Aug. 18, 2011

(30) Foreign Application Priority Data

Feb. 9, 2010 (FR) ...................................... 10 00536

(51) Int. Cl.
*F16K 11/20* (2006.01)
(52) U.S. Cl.
USPC .................................. 137/637.2; 137/614.18
(58) Field of Classification Search
USPC ........................... 137/240, 312, 614.18, 637.2
See application file for complete search history.

(56) References Cited

U.S. PATENT DOCUMENTS

| | | | | |
|---|---|---|---|---|
| 4,757,834 A | * | 7/1988 | Mieth | 137/15.06 |
| 5,699,825 A | * | 12/1997 | Norton | 137/238 |
| 6,178,986 B1 | * | 1/2001 | Burmester | 137/240 |
| 7,845,368 B2 | | 12/2010 | Burmester et al. | |
| 7,891,376 B2 | * | 2/2011 | Neuhauser et al. | 137/614.18 |
| 7,905,253 B2 | | 3/2011 | Burmester et al. | |
| 8,327,881 B2 | * | 12/2012 | Norton | 137/614.18 |
| 2007/0151611 A1 | | 7/2007 | Deger | |
| 2009/0065077 A1 | | 3/2009 | Neuhauser et al. | |

FOREIGN PATENT DOCUMENTS

WO    WO 2007/054131 A1    5/2007

* cited by examiner

*Primary Examiner* — John Fox
(74) *Attorney, Agent, or Firm* — Patterson Thuente Pedersen, P.A.

(57) ABSTRACT

The Valve device comprises two paths communicating depending on the position of a movable valve which includes a first and a second flap one of which being hollow. A third flap is freely mounted between the first and the second flaps assisting either the first and second flap in sealing either path.

16 Claims, 9 Drawing Sheets

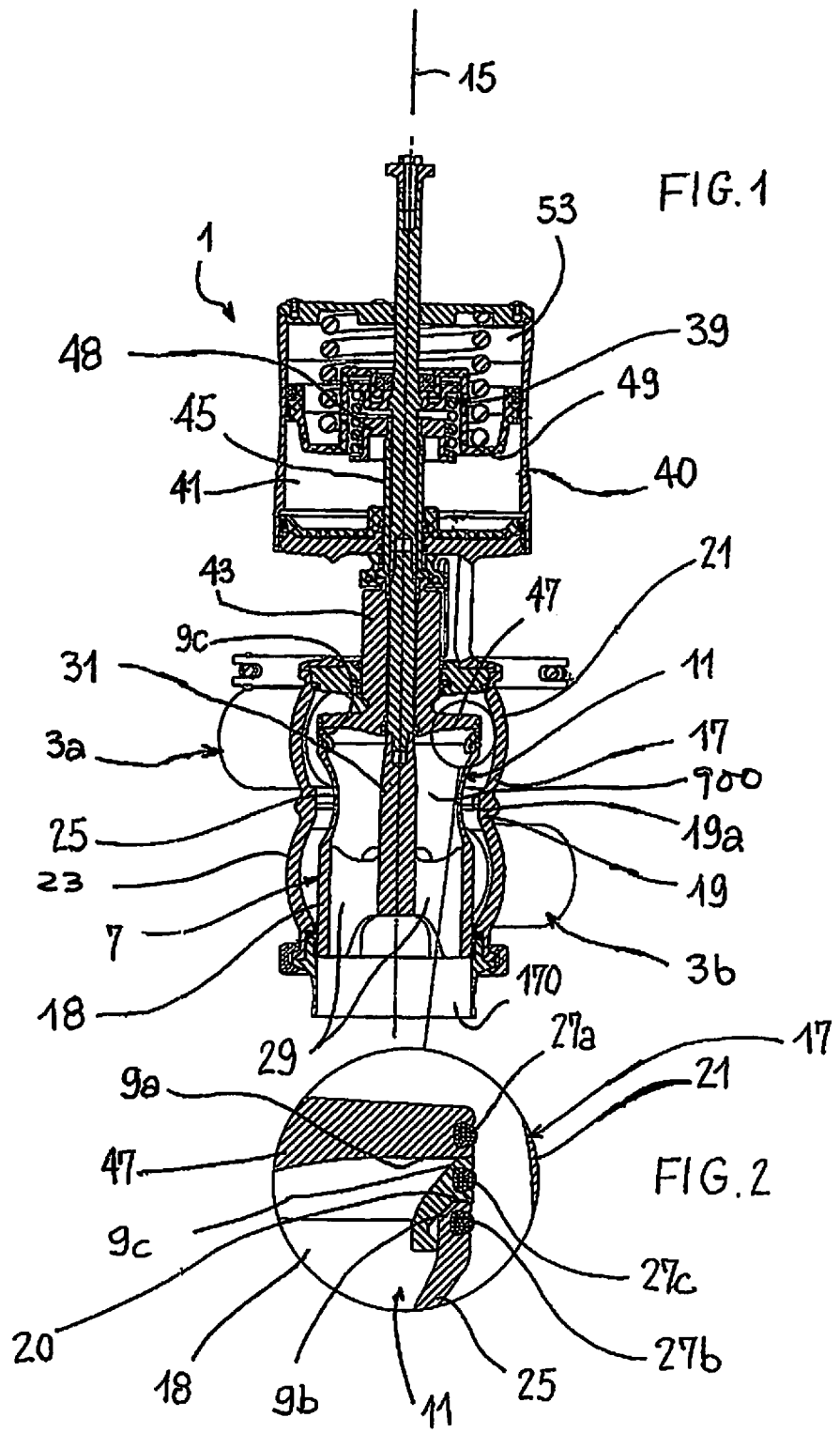

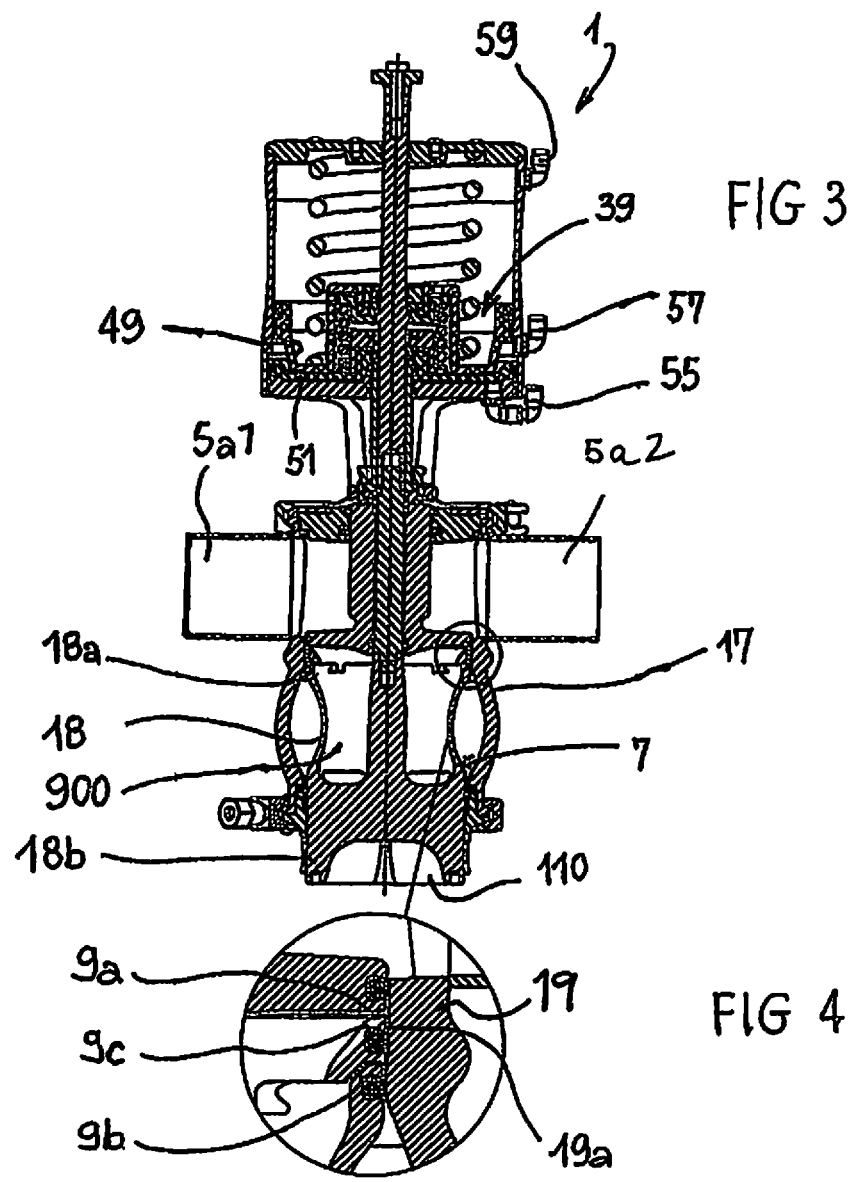

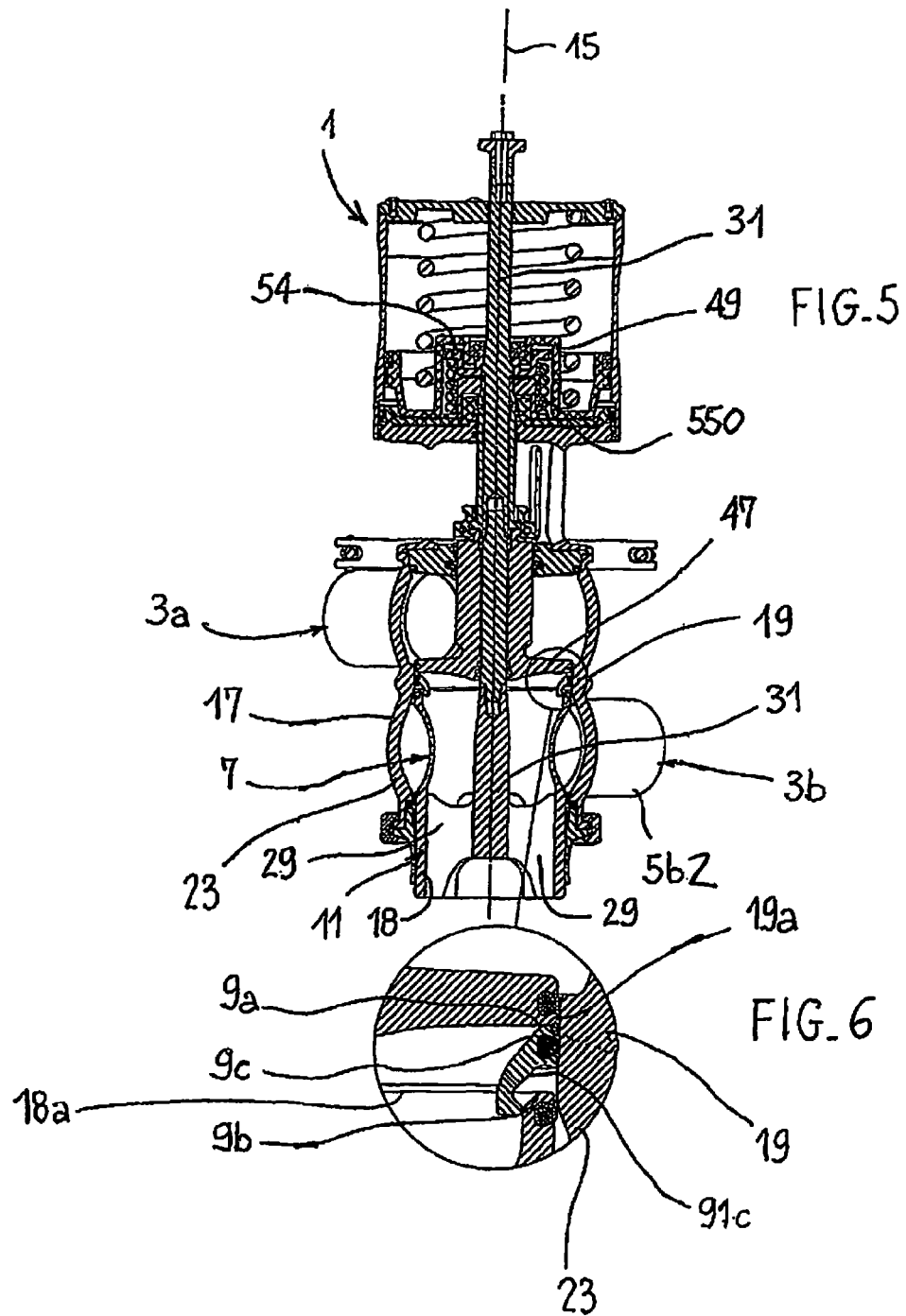

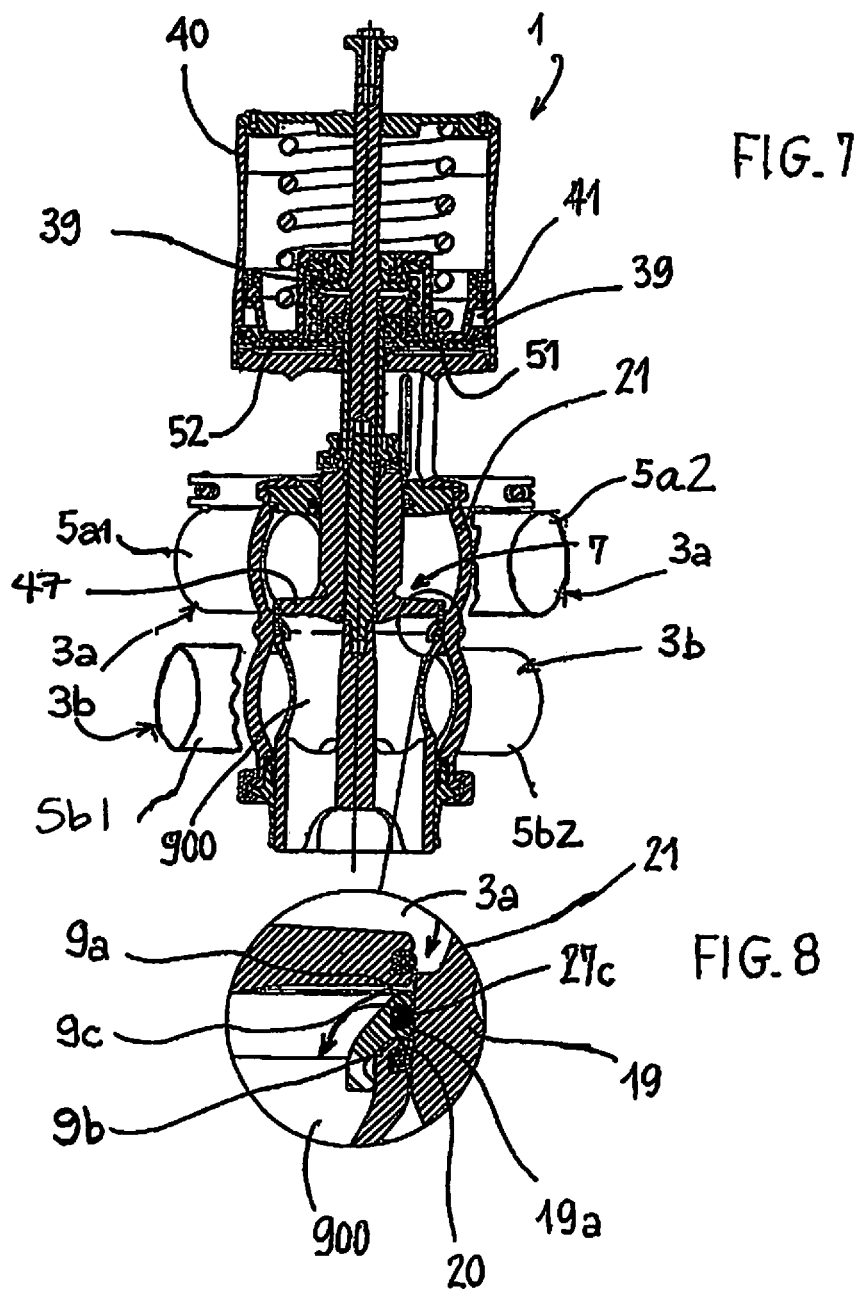

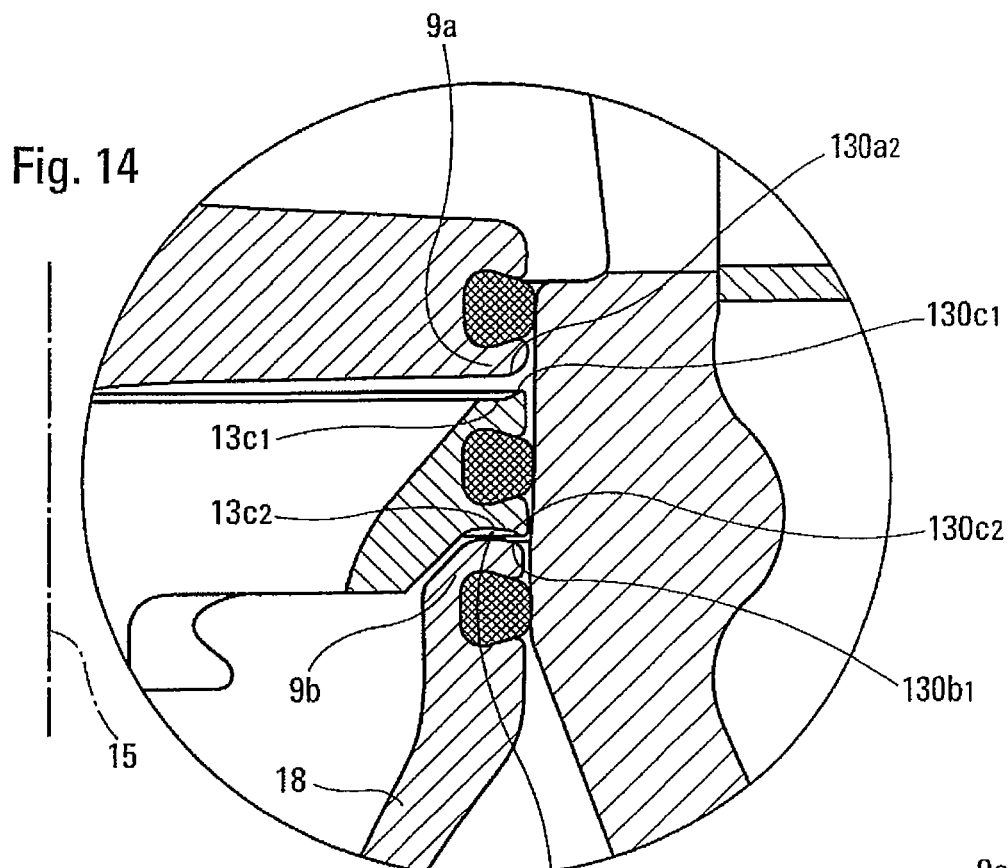
Fig. 14
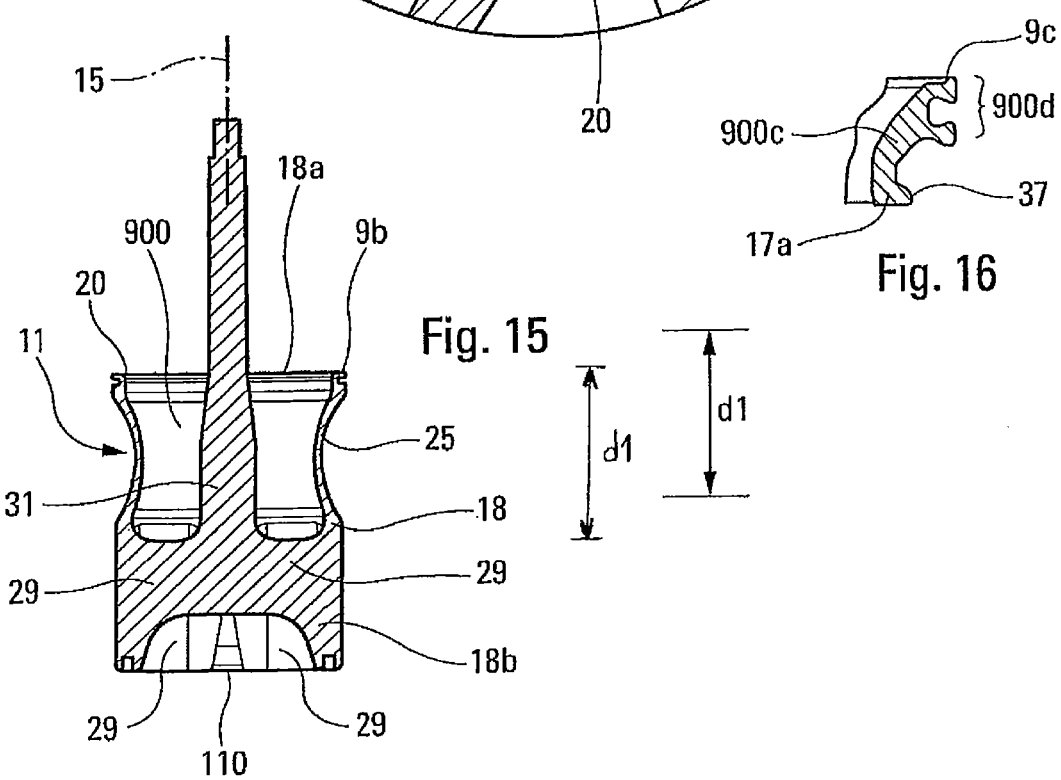
Fig. 15
Fig. 16

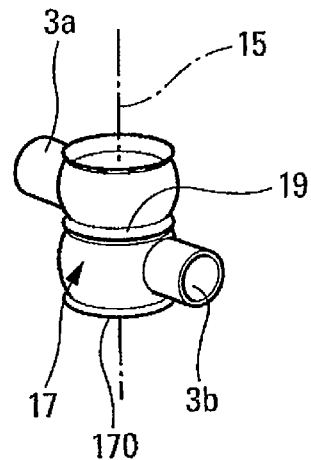
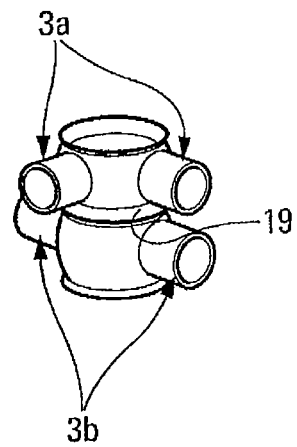
Fig. 20
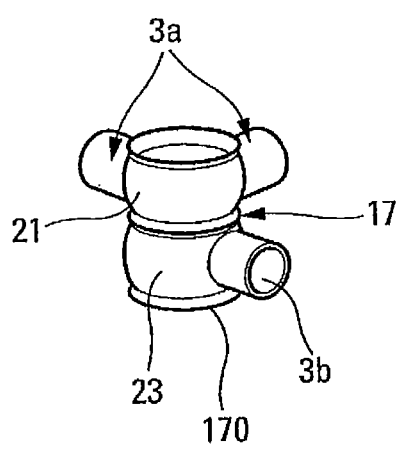
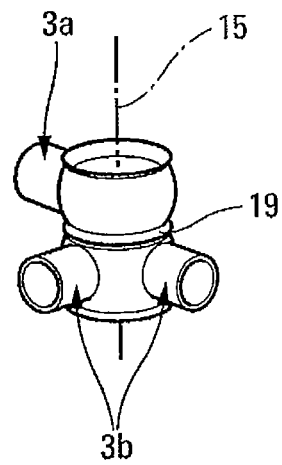

MULTI-PATH VALVE DEVICE FOR FLUID CIRCULATION

PRIORITY CLAIM

The present application claims priority to French Patent Application No. 10 00536, filed Feb. 9, 2010 and entitled "MULTI-PATH VALVE DEVICE FOR FLUID CIRCULATION," which is herein incorporated by reference in its entirety.

FIELD OF THE DISCLOSURE

The present invention is directed to a device for the circulation of liquids including the circulation of liquid-food such as milk or yogurt. Specifically, the present invention is directed to a valve device for controlling communication between at least two circulation paths.

BACKGROUND OF THE DISCLOSURE

In many industrial processes having multiple circulating fluid paths it is often necessary to have selective mixing of the fluids in the fluid paths. As such, a valve assembly is often positioned between two fluid paths that can be selectively articulated to permit or prevent mixing of the fluids circulating in the fluid paths. A commonly employed valve assembly for controlling the flow of fluids between two circulating fluid paths is a double seat valve assembly.

A double seat valve generally comprises two flaps each mounted to a movable body that can be independently moved to open or close an orifice between the circulating fluid paths. In most double seat valve assemblies, the movable body to which one of the flaps is mounted is hollow and defines a leakage path for selectively draining either fluid path. In this configuration, the two sets of flaps can be selectively engaged to each other to restrict the flow of fluid into the leakage path. The flaps of the double seat valve are can be generally configured in three operational modes. In the first mode, both sets of flaps are engaged to each other and the orifice to prevent flow of fluid between the two fluid paths and into the leakage path. In the second mode, both sets of flaps are engaged to each other, but are disengaged from the orifice to allow the flow of fluid between the two fluid paths while preventing the flow of fluid into to the leakage path. In the third mode, the first flap engages the orifice to prevent flow of fluid between the two fluid paths while the second flap is disengaged from the first flap and the orifice to allow flow of fluid from one of the fluid paths into the leakage path. The third operation mode is often used for selectively flushing of one of the fluid paths with cleaning or flushing fluids that are immediately discharged into the leakage path.

Double seat valves provide significant flexibility by allowing selective control of the flow of fluid between multiple fluid paths and allowing independent flushing of one of the fluid paths. However, double seat valves are inherently complex to provide all the required features with multiple moving parts that must be moved both independently and in unison. As such, the implementation and maintenance costs of double seat valves can be significant.

A related drawback is that sets of flaps must be effectively sealed to both the orifice and each other requiring seals to be employed, particularly to insure an effective seal between the flaps. An ineffective seal can cause inadvertent mixing of drainage of the fluids from the fluid paths, which can lead to significant problems when one of the fluid paths is being selectively cleaned with harsh cleaning chemicals while the other fluid path contains a product fluid such a liquid-food.

An approach to preventing cross-contamination of the fluid paths is disclosed in US Patent Application 2009/0008594 and is directed to an annular protrusion in the orifice for directing the fluid in the fluid path to be flushed to the center of the leakage path. Correspondingly, a spout is formed on the flap sealing the orifice during flushing adapted to interface with the protrusion. This approach significantly complicates the manufacturing process of the valve assembly. Another approach to prevent cross-contamination of the fluid paths is disclosed in US Patent Application 2009/0065077 and is directed to a barrier element between the flaps to protect the flap sealing the orifice. Specifically, the barrier element deflects the stream of flushing fluid from the flap sealing the orifice. However, the barrier element only accounts for one cause of leakage between the fluid paths. Both of the above references are herein incorporated by reference in their entirety.

As such there is a need for a means of effectively sealing the orifice during flushing situations that can account turbulent flow at the flaps, the pressures on both sides of the sealing flap, the types of fluids involved on both sides of the sealing flap and the positions of the relative components of the valve.

SUMMARY OF THE DISCLOSURE

The present invention is directed to a multi-path valve device having first and second flaps that can cooperate together to define a valve for selectively controlling flow between two fluid paths as well as independently sealing each fluid path to allow independent flushing of each fluid path. The multi-path valve device further comprises a third flap that can be positioned between the first and second flaps and adapted to assist either the first or second flap in sealing the connection between the fluid paths during flushing of one of the fluid paths to prevent leakage between the fluid paths.

A multi-path valve device, according to an embodiment of the present invention, can generally comprise a first flap mounted on a first movable body and a second flap mounted on a second movable body, wherein the second movable body can define a leakage chamber for flushing fluids out of a fluid path. The multi-path device can further comprise a third flap positionable between the first and second flaps and adapted to engage both the first and second flaps, individually or in combination. The first, second and third flaps each further comprise a gasket on the periphery of each flap for engaging the outer body defining the connection between the fluid paths. According to an embodiment of the present invention, the outer diameter of the second flap and its gasket can be less than the outer diameter of the first and third flaps with their respective gaskets. According to an embodiment of the present invention, the third flap can further comprise a groove on the periphery of the flap for receiving the gasket to prevent movement of the gasket and maintain the tightness of the seal with the outer body.

According to an embodiment of the present invention, the first and second flaps can comprise a metal, while the third flap can comprise a plastic material including, but not limited to, polyetheretherketone (PEEK). In this configuration, the plastic material of the third flap allows the third flap to sealingly engage either the first or second flap or both without a gasket.

According to an embodiment of the present invention, the third flap is freely movable between the first and the second flaps, which are movable with their respective movable body. The third flap is instead pushed into position by either the first or second flap as those flaps are positioned by their respective movable body. The third flap can also be held in position by its sealing engagement of the outer body until pushed by either the first or second flap. The movable bodies are adapted to move along an axis, wherein the first and second flaps engage the third flap to guide the third flap in moving along the axis.

The above summary of the various representative embodiments of the invention is not intended to describe each illustrated embodiment or every implantation of the invention. Rather the embodiments are chosen and described so that other skilled in the art can appreciate and understand the principles and practices of the invention. The figures in the detailed description that follow more particularly exemplify these embodiments.

BRIEF DESCRIPTION OF THE FIGURES

The invention can be completely understood in consideration of the following detailed description of various embodiments of the invention in connection with the accompanying drawings, in which:

FIG. 1 is a cross-sectional side view of a multi-path valve device according to an embodiment of the present invention wherein the valve is open allowing fluid circulation between both paths.

FIG. 2 is an enlarged cross-sectional side view of a portion of the flap assembly of the multi-path valve device depicted in FIG. 1.

FIG. 3 is a cross-sectional side view of a multi-path valve device depicted in FIG. 1 wherein the valve is closed restricting fluid circulation between both paths.

FIG. 4 is an enlarged cross-sectional side view of a portion of the flap assembly of the multi-path valve device depicted in FIG. 3.

FIG. 5 is a cross-sectional side view of a multi-path valve device depicted in FIG. 1 wherein the second flap is opened for flushing of the second path.

FIG. 6 is an enlarged cross-sectional side view of a portion of the flap assembly of the multi-path valve device depicted in FIG. 5.

FIG. 7 is a cross-sectional side view of a multi-path valve device depicted in FIG. 1 wherein the first flap is opened for flushing of the first path.

FIG. 8 is an enlarged cross-sectional side view of a portion of the flap assembly of the multi-path valve device depicted in FIG. 8.

FIG. 14 is an enlarged cross-sectional side view of the portion of the flap assembly of the multi-path valve device depicted in FIG. 4.

FIG. 15 is a cross-sectional view of a structure for moving the second flap of the flap assembly of the multi-path valve device according to an embodiment of the present invention.

FIG. 16 is a partial cross-sectional view along XVI-XVI of FIG. 9.

FIG. 20 is a perspective view of possible path arrangements around a multi-path valve device according to an embodiment of the present invention.

Figure 9:
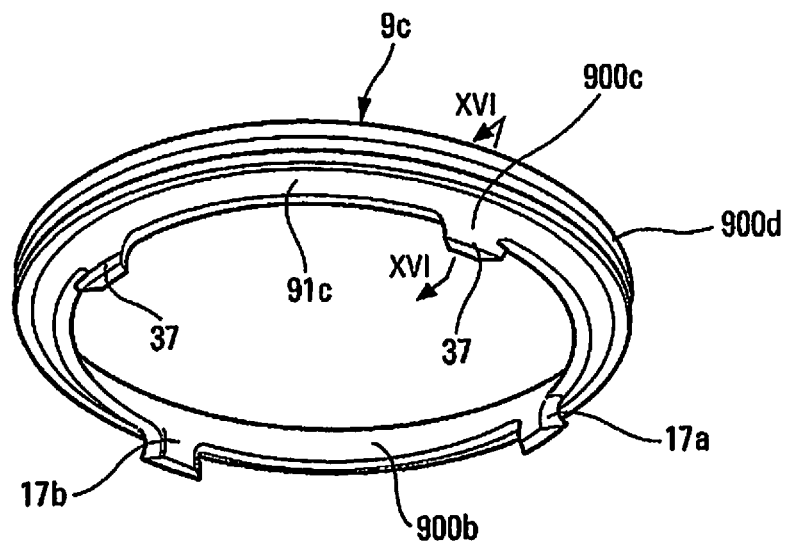
FIG. 9 is perspective view of the third flap of the multi-path valve device according to an embodiment of the present invention.

While the invention is amenable to various modifications and alternative forms, specifics thereof have been shown by way of example in the drawings and will be described in detail. It should be understood, however, that the invention is not limited to the invention to the particular embodiments described. On the contrary, the invention is to cover all modifications, equivalents, and alternatives falling within the spirit and scope of the invention as defined by the appended claims.

DETAILED DESCRIPTION OF THE FIGURES

As shown in FIG. 1, the present invention is directed to a multi-path valve device 7 for use with a multi-path circulation system 1. The multi-path circulation system 1 comprises a first path 3a and a second path 3b for independently circulating fluids. The first path 3a and the second path 3b are connected through a connector body 17 having a first path connector 21 fluidly connected to the first path 3a, a second path connector 23 fluidly connected to the second path 3b and an orifice section 19 allowing fluid connection between the first and second paths 3a, 3b. Referring to FIGS. 3, 5, and 7, each path 3a, 3b has an input 5a1, 5b1 and an output 5a2, 5b2 into its respective path connector 21, 23. Referring back to FIG. 1, the orifice section 19 further comprises an inner surface 19a.

Figure 10:
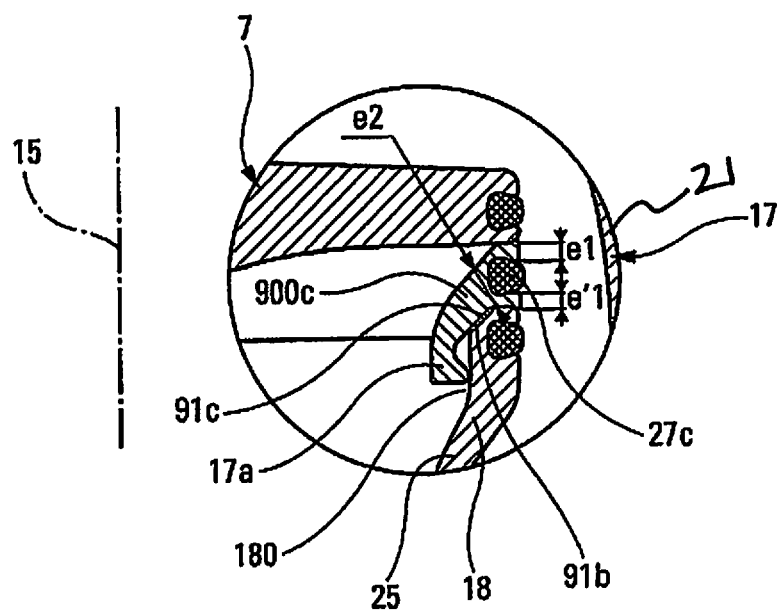
FIG. 10 is an enlarged cross-sectional side view of the portion of the flap assembly of the multi-path valve device depicted in FIG. 2.

As shown in one or more of FIGS. 1, 3, 5 and 7, a multi-path valve device 7, according to an embodiment of the present invention, comprises a hollow structural unit 11 defining a leakage chamber 900, disc 47, a first flap 9a, a second flap 9b and a third flap 9c. Each flap 9a, 9b, 9c can further comprise a gasket 27a, 27b, 27c (depicted in FIG. 2, for example) for sealingly engaging the inner surface 19a of the orifice. As shown in FIG. 10, according to an embodiment of the present invention, the second flap 9b further comprises or is mounted to hollow structural unit 11 comprising a flap body 18 and an interior surface 180 having a slanted portion 91b.

As shown in FIGS. 1, 9-10, and 16, according to an embodiment of the present invention, the third flap 9c can generally define a ring or annular shaped frusto-conical body surrounding an axis 15, and having a slanted surface 91c for interfacing with the slanted surface 91b of the second flap 9c. An outer (and inner) diameter of the third flap 9c narrows downwardly, that is, toward where the third flap 9c engages with the second flap 9b. Third flap 9c also includes a generally cylindrical part, where an external radial gasket 27c is disposed, and which extends axially on one side (here downward) by a substantially truncated cone shape.

The third flap 9c can also further comprise centering protrusions 17 engaging second flap 9c to maintain the alignment of flap 9c with first and second flaps 9a and 9b. With particular reference to FIGS. 9 and 16, these protrusions 17a, 17b extend, here locally downwards, from the narrowed part of the ring that defines the flap 9c. Similarly, the third flap 9c can also define a first annular skirt 900d for engaging the first flap 9a and a second annular skirt 900c for engaging the second flap 9b to further maintain the alignment of flap 9c with first and second flaps 9a and 9b.

Referring back to FIG. 1, as assembled, the first flap 9a is positioned on the periphery of the disc or discoid shape 47 while the second flap 9b is positioned on the structural unit 11 around the opening of the leakage chamber 900. The third flap 9c is positionable between the first and second flap 9a, 9b such that the disc 47 can sealingly engage the leakage chamber 900 to prevent fluids from entering the leakage chamber 900, wherein the third flap 9c acts as a gasket between the first and second flap 9a, 9b. According to an embodiment of the present invention, the first flap 9a and the second flap 9b can comprise a metal, including but not limited to steel. According to an embodiment of the present invention, the third flap 9c can comprise a hard plastic material, including but not limited to PEEK. In this configuration, the third flap 9c can act as a liquid tight seal between flap 9a, 9b without the need for a separate gasket between the flaps 9a, 9b, 9c.

As shown in one or more of FIGS. 2, 4, 6 and 8, the flaps 9a, 9b, 9c are positionable in different configurations along axis 15 relative to interior surface 19a to selectively control the flow of fluid between the two paths 3a, 3b. Axis 15 is also the displacement axis of the valve device 7 between different configurations or operating positions thereof, inside the connector body 17 provided with paths 3a and 3b.

As shown in FIG. 2, in one configuration, all three flaps 9a, 9b, 9c are engaged to each other, but are disengaged from interior surface 19a and positioned within either path connector 21, 23 to permit the flow of fluid around the flaps 9a, 9b, 9c and between the two paths 3a, 3b, thereby defining an open position.

As shown in FIG. 4, in another configuration, all three flaps 9a, 9b, 9c are engaged to each other and interior surface 19a to prevent the flow the flow of fluid between the two paths 3a, 3b, thereby defining a closed position.

Figure 12:
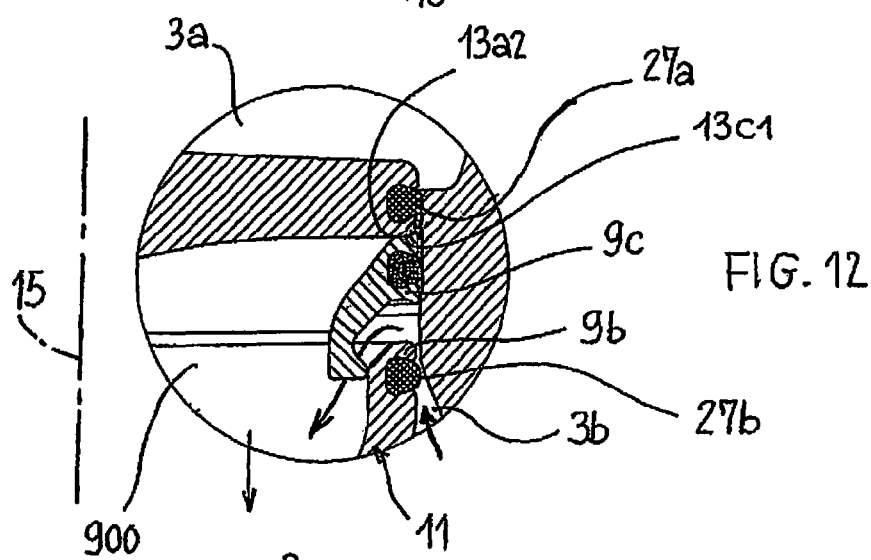
FIG. 12 is an enlarged cross-sectional side view of the portion of the flap assembly of the multi-path valve device depicted in FIG. 6.

As shown in FIGS. 5, 6, and 12, in yet another configuration, the first flap 9a and the third flap 9c are engaged to each other and interior surface 19a, while the second flap 9b is disengaged from interior surface 19a and axially spaced from third flap 9c, allowing the flow of fluid from only from the second path 3b into the leakage chamber 900, thereby defining a first cleaning position. In this configuration, the third flap 9c assists the first flap 9a in preventing the flow of fluid between the paths 3a, 3b.

Figure 13:
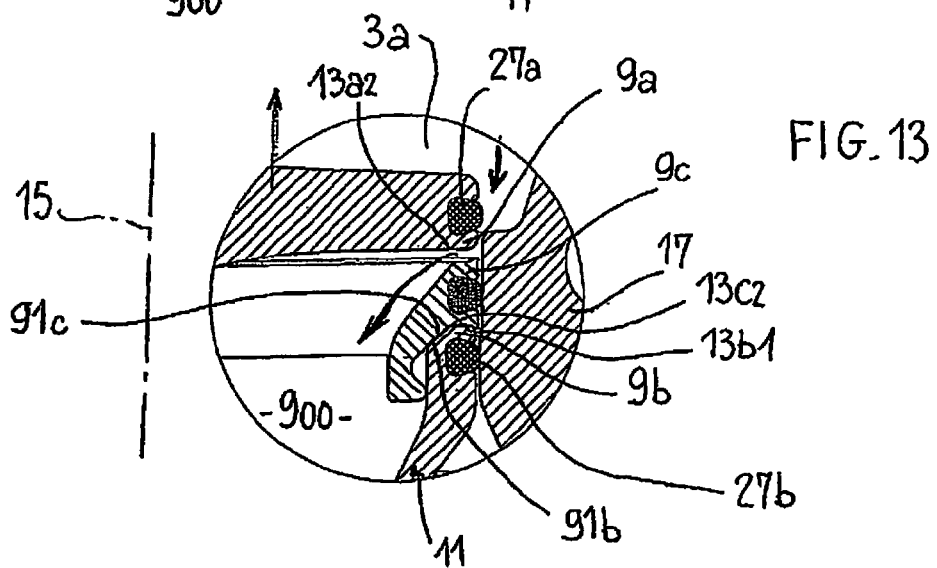
FIG. 13 is an enlarged cross-sectional side view of the portion of the flap assembly of the multi-path valve device depicted in FIG. 8.

Similarly, as shown in FIGS. 7, 8, and 13, the first flap 9a is disengaged from interior surface 19a and axially spaced from third flap 9c, while the second flap 9b and the third flap 9c are engaged to each other and interior surface 19a allowing the flow of fluid only from the first path 3a into the leakage chamber 900, thereby defining a second cleaning position. In this configuration, the third flap 9c assists the second flap 9b in preventing the flow of fluid between the paths 3a, 3b.

Figure 11:
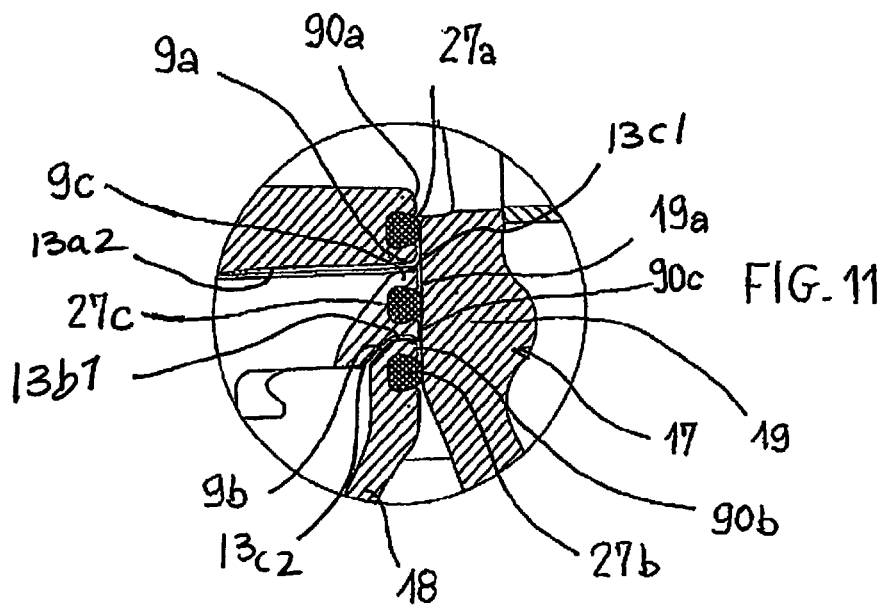
FIG. 11 is an enlarged cross-sectional side view of the portion of the flap assembly of the multi-path valve device depicted in FIG. 4.

To promote a sealed bearing between the flaps when they contact each other in the different operating positions or configurations, and referring to FIGS. 11, 12, and 13, bearing surfaces 13a2 of first flap 9a, 13c1 and 13c2 of third flap 9c, and 13b1 of second flap 9b are provided generally transverse to axis 15.

In the cleaning positions or configurations, referring to FIGS. 6 and 8, where one fluid is allowed to enter the leakage chamber 900 from path 3a, 3b, the disengaged flap 9a, 9b is positioned in the respective path connector 21, 23 which have a wider diameter than the orifice section 19 allowing fluid to flow around the flap 9a, 9b and into the leakage chamber 900. Axially, between the radially enlarged areas 21, 23, orifice section 19 defines a radially constricted part.

In the open position, referring to FIGS. 1, 2, and 10, the three flaps 9a, 9b, 9c are positioned in the enlarged area 21, and a constricted area 25 of the movable hollow body 18 beneath the flaps bearing areas/surfaces is located at the inner surface 19a of orifice section 19.

In the closed position, referring to FIGS. 3, 4, and 11, however, the three flaps 9a, 9b, 9c are situated lower and laterally held and sealed against the inner surface 19a of orifice section 19, yet without contacting each other by their said bearing surfaces (13a2, 13c1, 13c2, 13b1 of FIG. 11).

To promote a certain flexibility to the third flap 9c, in one embodiment, and referring to FIG. 10, third flap 9c has a thickness $e1+e'1$ at or in close proximity of each of the bearing surfaces 13c1 and 13c2, that is smaller than that, for example a total thickness $e2$ of third flap 9c that it exhibits adjacent to its bearing surfaces. This, combined with the plastic material, should give a certain deformation/squeezing capacity of the bearing surfaces 13c1, 13c2, enhancing a matching of the shapes between the aforementioned bearing surfaces for increasing sealing engagement.

In an embodiment, and referring to FIG. 11, to enhance radial tightness between the flaps 9a, 9b, and 9c and the connector body 17 when in the closed position, for example, the valve device can comprise annular gaskets 27a, 27b, 27c, each being disposed and protruding over the outer periphery, respectively, 90a, 90b, 90c, of the corresponding flap section. In a particular embodiment, the three gaskets 27a, 27b, 27c are identical, and are the only ones provided to the flaps. In the closed position, all three gaskets 27a, 27b, 27c bear against surface 19a, as depicted in FIG. 11.

In the first cleaning position, and referring back to FIGS. 5, 6, and 12, the second flap 9b is unsealed and axially displaced from the other two flaps 9a, 9c, by slightly descending below the inner surface 19a along axis 15. Gasket 27b is no longer in sealed engagement with inner surface 19a such that the fluid of the second path 3b can bypass gasket 27b, pass through flaps 9c, 9b and flow into the leakage chamber 900, the chamber 900 being open at both axial ends such that the fluid flows out of the device 7 and system 1, such as to a sewer.

In the second cleaning position, and referring back to FIGS. 7, 8, and 13, the first flap 9a is unsealed and axially displaced from the other two flaps 9b, 9c, by slightly raising over inner surface 19a along axis 15. Gasket 27a is no longer in sealed engagement with inner surface 19a such that the fluid of the first path 3a can bypass gasket 27a, pass through flaps 9c, 9b and flow into the leakage chamber 900, the chamber 900 being open at both axial ends such that the fluid flows out of the device 7 and system 1, such as to a sewer.

Referring to FIG. 14, in view of the fluid pressure, such as water, brought into the valve device for cleanings, and of the permitted discharge of fluids out of the chamber 900 below when in the two cleaning positions, the freely movable mounting of third flap (yet with the radial sealing via gasket 27c) allows for efficient sealed bearing of the third flap 9c against the flap opposite to the one which opens. For example, bearing surfaces 13c1, 13c2 respectively (described above) of third flap 9c define upper and lower surfaces of annular end parts 130c1, 130c2 which raise and lower respectively, so as to seal and cover respective coved corner 130a2, 130b1 of the first and second flap, in both open and cleaning positions of the valve, thereby accomplishing the desired direct sealed bearings (flap/flap).

Referring to FIG. 15, to further limit turbulences and/or unexpected fluid circulations which can otherwise take place in cleaning position(s) or when the second flap is mounted inappropriately, arms 29 operably couple the movable hollow body 18 to the central shaft 31 it surrounds, at a position removed from the flap area, and in one embodiment, towards the lower part of the body 18 (lower end 18b). In one particular embodiment, arms 29 are radial. In the embodiment of FIG. 15, and as an alternative to the embodiment of FIG. 1, central shaft 31 is a single piece.

In this embodiment, if also all the horizontal sections of the fluid passage in the leakage chamber 900 are made substantially identical so that to promote the flow of the cleaning fluid without risk of backflow, the aforementioned features related to arms 29 will limit the alteration risks of this flow, since a notable vertical space will exist between area 20 and the arm summit; represented as axial distance dl in FIG. 15. Thus, in the two cleaning positions, the fluid flow would be the least disturbed by the presence of the arms 29 which, if otherwise positioned too close to the flaps 9a, 9b, 9c, may create harmful disturbances.

Returning to the axial centering and guiding aspects of the third flap 9c, and referring back to FIG. 10, when third flap 9c comprises an annular flap, the centering and guiding of flap 9c is performed by the flap periphery, such as, for example, by outer periphery or second annular skirt 900c bearing against an inner wall 91b/180 of body 18.

Although less efficient, (an) excrescence(s) (not shown) towards the upper part of the body 18 may also achieve this effect, such as, for example, via inner periphery 900b of flap 9c (FIG. 9), or a peripheral annular skirt, which falls from the flap and is solid or alternatively crossed by fluid passage orifices, may come to bear against body 18.

Centering protrusions 17a, 17b will provide axial centering and guiding aspects of third flap 9c by bearing externally against the inner periphery 180 of the second flap (body 18). This bearing can exist in all operating positions, unlike the sealed peripheral/radial relationship with the surface 19a which operates in only the cleaning positions and the closed position. In a particular embodiment, as shown in FIGS. 9-10, several protrusions (e.g. four) are spaced about an outer periphery of flap 9c, extending below the second annular skirt 900c. In an embodiment, and referring to FIGS. 17 and 16, to perfect the axial centering/guiding aspect, each centering protrusion can comprise an outward bulge 37 that defines a bearing segment (as shown in FIG. 9) which connects, by a portion 900c curved inwardly, to an annular part 900d of the flap.

Thus, third flap 9c is guided within device 7 without physical coupling to the central shaft 31 which it crosses or intersects.

As shown in at least one of FIGS. 1, 3, 5, 7 and 15, the valve device 7 can further comprise an actuator 39 for moving positioning flaps 9a, 9b. The actuator 39 comprises a central shaft 31, a secondary shaft 43 and a pneumatic actuator having a first chamber 41 and a second chamber 53 within an enclosure 40. The actuator 39 can further comprise a movable plate 49 for separating the first and second chamber 41, 53. As assembled, the secondary shaft 43 is integrated with disc 47 to which the first flap 9a is mounted. Secondary shaft 43 can further comprise an actuator shaft 45 affixed to a disc 48 acting on plate 49. Within enclosure 40, plate 49 extends thus between chambers 41 and 53, the plate 51 between chambers 41 and 52. Within shaft 45, shaft 31 freely crosses plate 51. In the upper part, said shaft 31 is integral with an upper disc 54 acting also on plate 49. A spring 550 prevents the bringing together of discs 48, 54. Connectors 55, 57, 59 make it possible to vary the pneumatic pressure within chambers 52, 41, 53, respectively. According to an embodiment of the present invention, the second flap 9b can be connected by arms 29 to central shaft 31 which intersects shaft 43 to which is connected the first flap 9a.

As shown in FIGS. 1, 3, 5, 7, the third flap 9c is freely movable between flaps 9a, 9b independent of direct control by the actuator 39. Instead, the third flap 9c is indirectly positioned by actuator 39 by being pushed into positioned by flaps 9a, 9b.

In view of the above, the valve device according to embodiments of the invention thus contains three flaps 9a, 9b, 9c and is therefore of the triple seat valve type (triple seat flaps). In the case of the cleaning of the upper path 3a (first cleaning position), once the first flap 9a is open as depicted in FIGS. 8 and 13, the flow of the cleaning liquid which rushes in the leakage chamber 900 drives the third flap 9c downward along axis 15 which, though free or independent from, is still in friction against the wall 19a and naturally abuts in a sealed manner against the second flap 9b held stationary in a closed position. Therefore, the valve device exhibits is triple tightness because the third flap 9c is also in sealed relationship with the wall 19a of body (via gasket 27c), the second flap 9b is also in sealed relationship with wall 19a of body (via gasket 27b), and the second and third flaps 9b, 9c are also mutually in sealed relationship via their contacting bearing surfaces 13b1, 13c2. Thus, in this case, the second flap 9b will play both roles, that of the closing means in its contact with its radial seat 19a and that of an axial seat (in 13b1) for the third flap 9c. Therefore, the sealed connection between second and third flaps 9b, 9c particularly prevents the risks of cleaning liquid backflow which can occur in a number of limit conditions and/or certain pressures.

In the event of the cleaning of the lower path 3b (second cleaning position), the same is observed between flaps 9a and 9c (held upwards) and the same wall 19a, as depicted in FIGS. 6 and 12.

Figure 17:
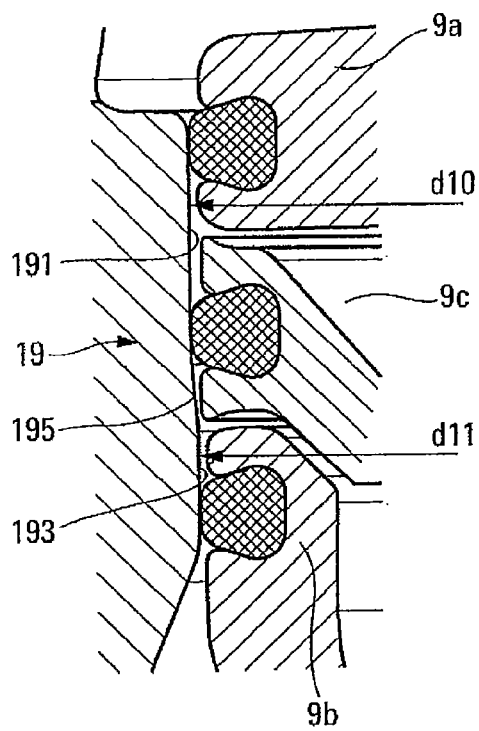
FIG. 17 is a cross-sectional view of a valve assembly of a multi-path valve device according to an embodiment of the present invention wherein the valve is closed restricting fluid circulation between both paths.
Figure 18:
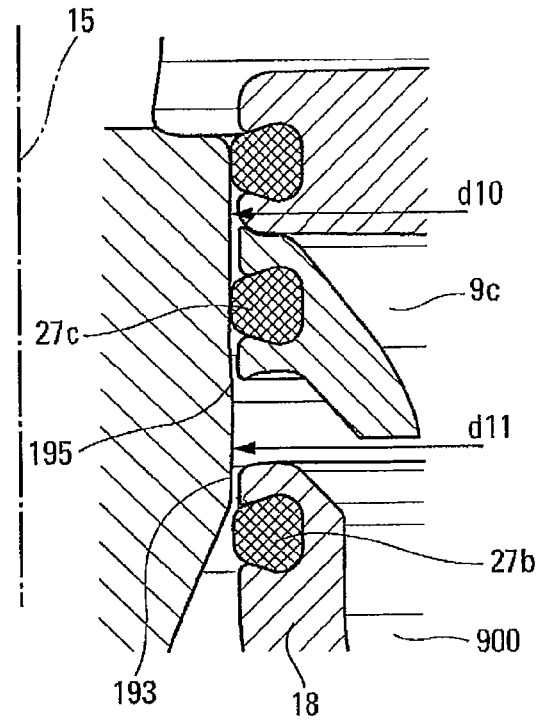
FIG. 18 is a cross-sectional view of a valve assembly of a multi-path valve device according to an embodiment of the present invention wherein the second flap of the valve assembly is opened for flushing of the second path.
Figure 19:
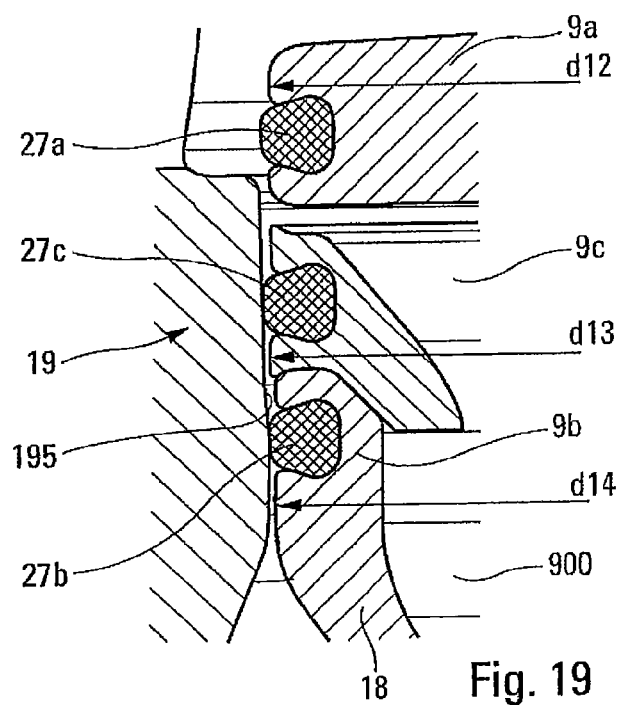
FIG. 19 is a cross-sectional view of a valve assembly of a multi-path valve device according to an embodiment of the present invention wherein the first flap of the valve assembly is opened for flushing of the first path.

In a particular embodiment, wall 19a exhibits different diameters about the seat of the first and third flaps 9a 9c, and about the second flap 9b. Referring to FIGS. 17-19, a first inner diameter d10 of connector body 19 (seat 191) is a few tens of millimeters to 2 mm greater than a second inner diameter d11 at seat 193 for second flap 9b. Between these two seats 191, 193, there is an oblique slope 195 defining a truncated cone.

Correspondingly, the outer diameters, respectively d12 and d13, of first and third flaps 9a, 9c will be identical, while outer diameter d14 of the second flap 9b a few tens of millimeters to 2 mm smaller. If the gaskets 27a, 27b, 27c are each mounted on a peripheral section of one of these flaps are identical, then the above mentioned will also be checked for the outer diameters, including the gaskets.

In summary, the first, the second and the third flaps 9a, 9b, 9c are movable between said positions that valve device 7 can occupy along common displacement axis 15, within the outer, fixed connector body 19 with, from top to bottom, the first, the third then the second flaps, with the latter belonging to hollow body 11, such that to insure the flow of the flushing fluid in chamber 900. The flaps 9a-9c have, respectively, a first, second and third gaskets in outer periphery, respective diameters of first and second gaskets being identical, that of the third gasket being smaller than the two previous ones. The connector body has a first inner diameter d10 against which the first and the third flaps 9a, 9b bear when device 7 is in said closed position, and against which the third flap 9c bears in the two possible cleaning positions. The connector body also has, in a lower position, a second inner diameter d11, smaller that the first diameter d10, against which the second flap 9b bears when device 7 is in the valve closed position, and in one of the cleaning positions where the first flap 9a is opened and positioned higher or above said first diameter d10. To move the valve device 7 to the open position depicted in FIGS. 1, 2, and 10, the actuator 39 moves the flaps 9a and 9b (which in turn guide flap 9c) above the first inner diameter d10 of the fixed body, thereby allowing fluid communication between paths 3a and 3b.

As depicted in FIG. 20, in which several possible arrangements of paths 3a, 3b are illustrated, any number of inputs or outputs can for paths 3a, 3b can be centered on the movably-mounted valve between the upper and lower paths 3a, 3b. According to an embodiment of the present invention, the connector 17 comprises an open bottom 170 allowing access the open bottom 110 of the structural unit 11 through which each leakage chamber 900 communicates with the outside.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative embodiments.

The invention claimed is:

1. A valve device for a multi-path circulation system, the system including a hollow connector body presenting structure defining first and second fluid circulation paths in selective fluid communication with each other, the valve device being movably mounted between the first and second fluid circulation paths, and movable through the hollow connector body along an axis such that the first and second fluid circulation paths either communicate or not with each other depending on position of the valve device mounted therebetween, the valve device being selectively shiftable along the axis within the connector body between an open position, a closed position, a first cleaning position, and a second cleaning position, the valve device comprising:
    first and second valve flaps, the second valve flap being coupled to or belonging to a hollow movable body, the hollow movably body defining an inner leakage chamber;
    an actuator assembly for moving the first and second valve flaps along the axis of the connector body, the actuator assembly comprising at least a central shaft operably coupled to the first and second valve flaps,
    wherein the first and second valve flaps are designed to be mounted within the connector body of the circulation system to—
        prevent communication between the first and the second fluid circulation paths, when in the closed position,
        allow communication between the first and second fluid circulation paths, around first and second flaps, when in the open position,
        prevent communication between said first and second fluid circulation paths, while allowing communication between only one of said paths and the leakage chamber when in the first cleaning position, and
        allow communication between only the other of said paths and the leakage chamber when in the second cleaning position of the valve device; and
    a third valve flap positioned between the first and the second flaps, the third valve flap being mounted on the valve device without physical connection to the central shaft such that the third valve flap is freely movable along the axis of the connector between the first and second valve flaps, and independently of direct control movement by the actuator,
    wherein the third valve flap exhibits a sealed relationship with the first valve flap when in the first cleaning position in which the third valve flap sealingly engages the first valve flap, and with the second valve flap when in the second cleaning position in which the third valve flap sealingly engages the second valve flap, and
    wherein in the first and second cleaning configurations, two of the first, second, and third valve flaps laterally engage an inner surface of the hollow connector body.

2. The valve device according to claim 1, wherein the third valve flap is mounted such that the third valve flap is freely movable in the first and second cleaning positions between the first and the second valve flaps, which are movable under control of the actuator assembly, the third valve flap being guided in its movements by bearing against one of said first and second valve flaps.

3. The valve device according to claim 2, wherein:
    the first, second and third valve flaps are movable between said open and closed positions along a common displacement axis coaxial with the axis of the connector body and inside the hollow connector body in which, in order from top to bottom of the connector body, the first, the third, then the second valve flaps are mounted,
    the second valve flap belonging to said hollow movable body so as to ensure a flow of flushing liquid therethrough into the inner leakage chamber when the valve device is in the first and second cleaning positions,
    said valve flaps respectively bearing first, third and second outer periphery gaskets, respective diameters of said first and second gaskets being identical, and a diameter of the third gasket being smaller than the diameter of the first and second gaskets, and
    the hollow connector body in which the valve device is mounted having:
    a first inner diameter at a first location along the axis of the connector body against which bear the first and the third valve flaps when the valve device is in said closed position, and the third valve flap when the valve device is in each of the two cleaning positions, and
    a second inner diameter at a second location along the axis of the connector body, the second inner diameter being smaller than the first diameter, and against which bears the second valve flap when the valve device is in a closed position, and in one of the cleaning positions, in which the first valve flap is positioned higher than said first location of the first diameter and is therefore open to allow fluid communication between the first fluid path and the leakage chamber, and
    wherein the actuator assembly moves the flaps along the displacement axis to the open position by raising them above the first inner diameter of the connector body.

4. The valve device according to claim 1, wherein the third valve flap is annular and is independently guided along said axis, towards an outer periphery thereof, by:
    radial contact with one of the first and second flaps, and,
    in the first and second cleaning positions, by a sealed relationship, with the inner surface of said hollow connector body.

5. The valve device according to claim 1, wherein the first and second valve flaps are made of metal, the third valve flap containing a plastic material adapted to be fluid-tight by gasket-free sealed bearing, in both cleaning positions, against the first or the second valve flaps, respectively.

6. The valve device according to claim 5, wherein the first, second and third valve flaps each comprise a gasket being mounted on a peripheral section of one of said valve flaps, and wherein outer diameters of said first and third valve flaps and outer diameters of the gaskets are identical.

7. The valve device according to claim 1, wherein the third valve flap is made of PEEK.

8. The valve device according to claim 1, wherein:
the first and second valve flaps are movable between said respective closed and open positions, along a common displacement axis coaxial with the axis of the connector body, and
the third valve flap positioned therebetween is provided with outer periphery centering spouts, so as to locally bear externally against an inner periphery of the second valve flap of the hollow body.

9. The valve device according to claim 8, wherein each centering spout externally comprises a bulge that defines a bearing segment and which connects via an inwardly curved part to an annular part of the third valve flap.

10. The valve device according to claim 1, wherein:
the first, second and third valve flaps extend transversely to a vertical axis along which they are movable, with, from top to bottom, the first, the third and the second valve flaps, and,
the third valve flap has a body with a diameter which narrows in a downward direction from top to bottom of the flap, and then extends outwardly at the bottom of the flap to define centering spouts for bearing against the second valve flap.

11. The valve device according to claim 10, wherein:
the third valve flap has structure defining a groove on an outer peripheral section where a gasket is provided, to ensure, both in said closed position and said first and second cleaning positions, tightness against said fluid through contact with the connector body in which valve device moves, and
the third valve flap is freely movable in the first and second cleaning positions, between the first and the second valve flaps.

12. The valve device according to claim 10, wherein the body of the third valve flap is frustoconical in shape.

13. The valve device according to claim 1, wherein the first, second and third valve flaps each comprise a single gasket, said respective three gaskets being identical and mounted respectively on a peripheral section of said valve flaps, for tightness between each one of them and the inner surface of the hollow connector body in which the valve is movably mounted.

14. The valve device according to claim 1, wherein the third valve flap comprises bearing surfaces transverse to the axis of the connector body, the bearing surfaces being arranged to be deformed and crushed during contact with at least one of the first and second valve flaps.

15. The valve device according to claim 14, wherein the bearing surfaces respectively define, with respect to the axis extending longitudinally or vertically along the connector body, upper and lower surfaces terminating in annular end portions, said annular end portions adapted to be raised and lowered respectively along the axis to sealingly engage and cover a corresponding rounded end portion of both first and second valve flaps when in the open position, and the corresponding rounded end portion the first valve flap when in the first cleaning position, and the corresponding rounded end portion of the second valve flap when in the second cleaning position.

16. The valve device according to claim 1, wherein the second valve flap is integral with the hollow movable body.

* * * * *